United States Patent
Weissbrich et al.

[11] Patent Number: 5,147,006
[45] Date of Patent: Sep. 15, 1992

[54] FRICTION CLUTCH

[75] Inventors: Alfons Weissbrich, Gauting; Horst Nikl; Nikolaus Wahnschaffe, both of Wolfsburg, all of Fed. Rep. of Germany

[73] Assignee: Volkswagen AG, Fed. Rep. of Germany

[21] Appl. No.: 640,361

[22] PCT Filed: Jul. 7, 1989

[86] PCT No.: PCT/EP89/00781
    § 371 Date: Jan. 29, 1991
    § 102(e) Date: Jan. 29, 1991

[87] PCT Pub. No.: WO90/01640
    PCT Pub. Date: Feb. 22, 1990

[30] Foreign Application Priority Data

Aug. 12, 1988 [DE] Fed. Rep. of Germany ....... 3827349

[51] Int. Cl.⁵ .............................................. F16D 43/02
[52] U.S. Cl. .................... 180/79.4; 192/54; 192/34
[58] Field of Search ................ 180/79.1; 192/54, 34, 192/35

[56] References Cited
U.S. PATENT DOCUMENTS

| | | | |
|---|---|---|---|
| 2,827,994 | 3/1958 | Tiedeman et al. | 192/54 X |
| 3,578,119 | 5/1971 | Auriol | 192/70.14 |
| 4,733,743 | 3/1988 | Weiss et al. | 180/255 |

FOREIGN PATENT DOCUMENTS

| | | |
|---|---|---|
| 3612619 | 6/1986 | Fed. Rep. of Germany . |
| 824072 | 2/1958 | France . |
| 274955 | 7/1951 | Switzerland . |
| 772682 | 4/1957 | United Kingdom . |
| 1182816 | 3/1970 | United Kingdom ............. 180/79.1 |

*Primary Examiner*—Charles A. Marmor
*Assistant Examiner*—Kevin Hurley
*Attorney, Agent, or Firm*—Brumbaugh, Graves, Donohue & Raymond

[57] ABSTRACT

In the representative embodiments described in the specification, a cup-shaped clutch drive member, driven by a drive pinion, rotates about an axially displaceable output shaft. Friction disks alternately coupled to the drive member and the shaft are pressed together to actuate the clutch. To apply actuating pressure to the friction disks without requiring excessive shaft motion, a pressure plate is mounted on the shaft and two pressure-generating members, interposed between the pressure plate and the friction members, have facing surfaces which are oppositely inclined with respect to the clutch axis. The pressure-generating member closest to the friction disks is angularly coupled to the drive member while the other pressure-generating member is free to rotate but held axially captive in the drive member.

3 Claims, 1 Drawing Sheet

FRICTION CLUTCH

BACKGROUND OF THE INVENTION

This invention relates to friction clutches having a plurality of interengaging friction elements alternately coupled to relatively stationary and movable clutch members and movable toward and away from each other along an axis.

A friction clutch of the above type is described, for example, in German Offenlegungsschrift No. 19 25 957. In such clutches, the magnitude of the torque transmitted depends, among other things, on the total number of cooperating friction elements, which may have disk-shaped or conical friction surfaces, on the mean diameter of the friction surfaces of the elements that come into contact with each other, and on the level of the pressure exerted axially by a pressure plate which presses the friction elements together.

In order to increase the axial force exerted on the engaging friction surfaces of the friction elements in the above-mentioned friction clutch, and hence the torque transmitted by the friction clutch, two pressure-generating clutch elements located farthest from the pressure plate have matching opposed ramp portions on their facing surfaces, disposed concentrically with respect to the axis of rotation of the clutch. The ramp-like surface regions of these two pressure-generating elements are so configured and arranged that the two elements are forced axially apart upon relative rotation by the engaging ramp-like surfaces so that an additional axial force is exerted on the friction elements, adding to the axial force applied by the pressure plate itself.

At the same time, the pressure plate of this conventional friction clutch, just as in the case of other conventional friction clutches of this type having no engaging ramp surfaces for increasing the axial force, must traverse a given actuation distance before the clutch becomes fully engaged. The extent of this actuation distance depends on the elasticity of the assembly of friction elements and on the total clutch spacing, i.e., the total of the separate axial spaces between the individual friction elements when the clutch is not actuated. Thus, the greater the total number of friction elements, the greater the actuation distance. As the friction linings undergo wear, the total clutch spacing increases correspondingly, so that the actuation distance becomes even greater.

In many cases, however, greater actuation distances, or actuation distances which increase markedly during operation because of lining wear, are not acceptable. For example, limited space conditions may permit only a limited actuation distance, or the time behavior of clutch performance may be unduly impaired by increased actuation distance.

Examples of such critical applications are motor vehicle servo steering gears of the type disclosed, for example, in German Offenlegungsschrift No. 36 12 619, in which the servo moment assisting the steering force is supplied not by a hydraulic cylinder and piston system but by a rotary, preferably electric, servo motor. This moment is transmitted by way of at least one friction clutch to the shaft of the steering gear. In such a motor vehicle servo steering gear, the actuation distance of the friction clutch employed must be comparatively small and must remain as small as possible because the servo assistance must begin after a very small angle of motion.

SUMMARY OF THE INVENTION

Accordingly, it is an object of the present invention to provide a new and improved friction clutch which overcomes the disadvantages of the prior art.

Another object of the invention is to provide a friction clutch having a comparatively small actuation distance and, moreover, one that remains small after use so as to be suitable in particular for use in electric motor-driven servo steering systems.

These and other objects of the invention are attained by providing a friction clutch having pressure-generating clutch members with engaging ramp-like surfaces interposed between a pressure plate and the friction members, the pressure-generating clutch member farthest from the pressure plate being axially movable but rotationally fixed with respect to the clutch drive and the other pressure-generating clutch member being rotationally movable with respect to but axially captive in the clutch drive.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
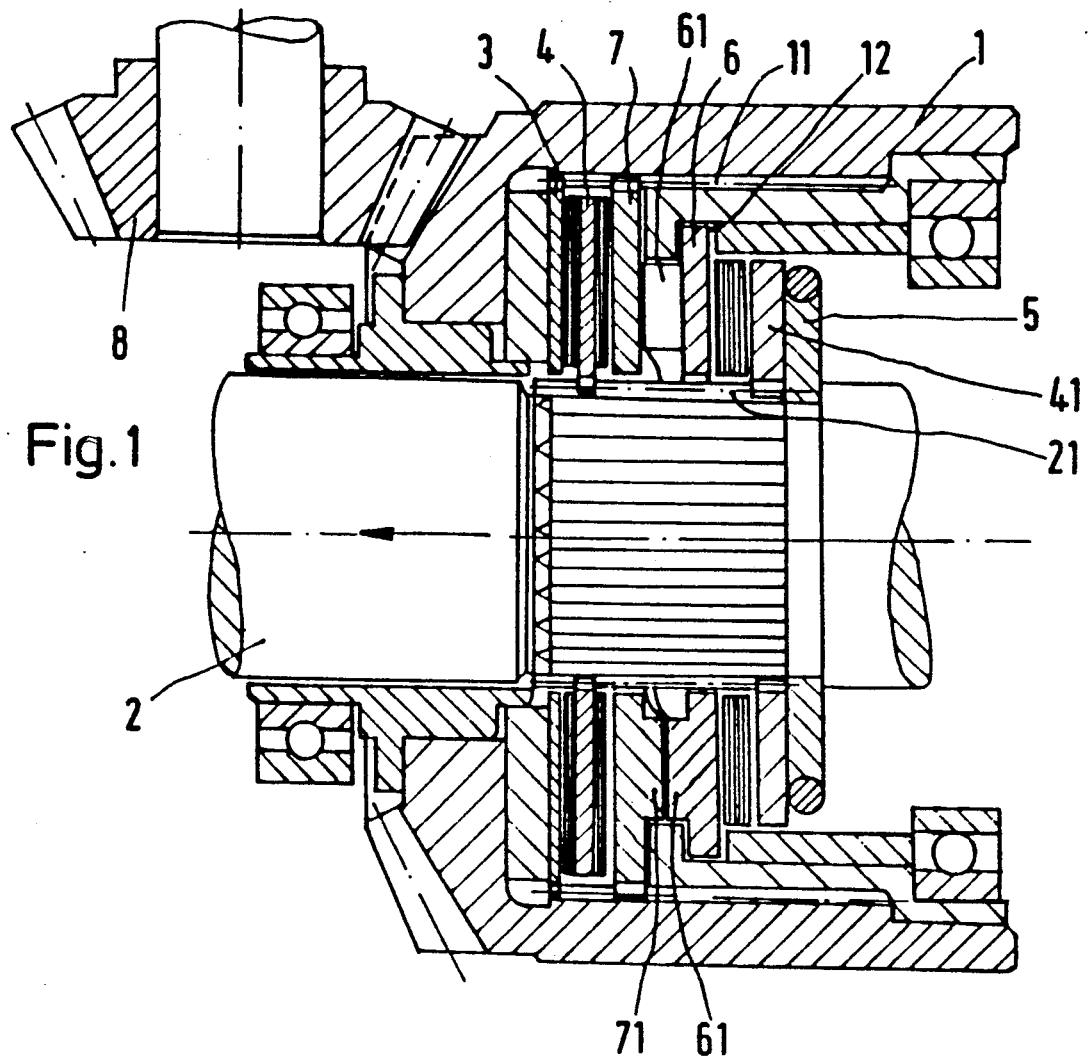
FIG. 1 is a view in longitudinal section showing a representative friction clutch arranged according to the invention.

The representative embodiment of the invention illustrated in the drawings constitutes a portion of a motor vehicle servo steering system of the type disclosed in German Offenlegungsschrift No. 36 12 619. In that system, the servo moment delivered by a servo motor rotating only in one direction is transmitted automatically to the shaft of the steering gear by one or the other of two friction clutches according to the direction of the steering motion. Only one of two such friction clutches, arranged in accordance with the present invention, is illustrated in the drawings.

This friction clutch consists of a clutch drive powered by way of a pinion 8 from a servo motor, not shown. The clutch drive is in the form of a cup-shaped outer member 1, and a clutch output shaft 2 is arranged coaxially therewith, with two friction members, which may be in the form of disks 3 and 4 operationally located between the clutch drive 1 and the output shaft 2 and coaxially arranged with respect to those members. The friction members are axially displaceable and are alternately linked in angularly fixed relation to the outer clutch member 1 and to the clutch output shaft 2, respectively. To provide an angularly fixed connection in a conventional manner, the friction members 3 which are linked to the outer clutch member have outwardly projecting teeth which engage matching grooves 11 in the outer member 1 and the friction members 4 which are linked to the output shaft 2 have inwardly projecting teeth which engage corresponding grooves 21 in the shaft 2. If desired, the clutch may include more than two cooperating friction members 3 and 4 in the usual manner.

A pressure plate 5 mounted on the clutch output shaft 2 is arranged to cause the friction members to be urged into frictional engagement when the output shaft 2 is displaced in the direction of the arrow in response to a suitable steering moment as described above. The clutch output shaft thus simultaneously performs the function of an axial pressure-applying device as well as the output connection from the clutch.

Between the pressure plate 5 and the friction members 3 and 4 are two specially configured pressure-generating clutch members 6 and 7. These members have facing surfaces provided with matching surface areas 61 and 71, respectively, which are coaxial to the axis of rotation of the clutch and which are shaped with opposite inclinations in the axial direction in ramp-like fashion. The matching surface areas 61 and 71 are maintained in engaging relation and are configured and disposed so that the two pressure-generating members 6 and 7 are urged axially apart upon relative rotation.

Figure 2:
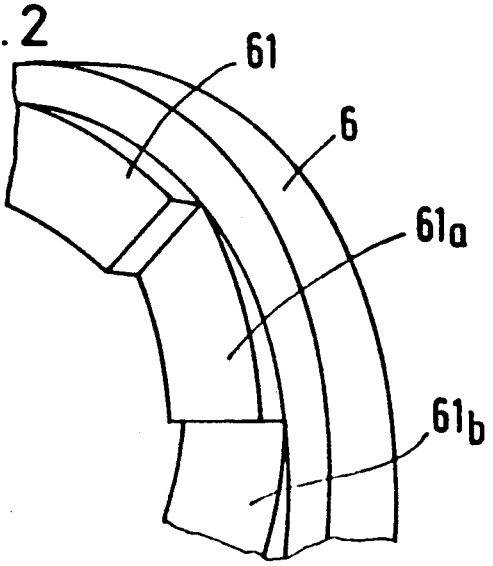
FIG. 2 is a fragmentary perspective view showing a portion of a pressure-generating member in the friction clutch illustrated in FIG. 1.

FIG. 2 illustrates in perspective a portion of the pressure-generating clutch member 6 which is located nearer to the pressure plate 5. In the illustrated portion, three of the ramp-like surface regions 61, 61' and 61" arrayed along the circumference are shown. The other pressure-generating clutch member 7 which cooperates with the member 6 is configured similarly, but with opposed inclination of the ramp-like surfaces.

The sides of the pressure-generating members 6 and 7 which are not in facing relation have friction surfaces similar to those of the friction members.

The pressure-generating clutch member 7 adjacent to the friction members 3 and 4, i.e., located farther away from the pressure plate 5, is axially displaceable and is linked in angularly fixed relation to the outer clutch member 1 similarly to the friction elements 3. Consequently, the member 7 rotates together with the outer clutch member 1 which is driven by the pinion 8.

On the other hand, the pressure-generating clutch member 6 which is located closer to the pressure plate 5 is supported for both axial and angular motion with respect to the output shaft 2 and it is not linked angularly to the outer member 1. Instead, the outer periphery of the member 6 is received in an annular groove 12 formed in the outer clutch member 1 with some axial clearance and therefore cannot move axially with respect to the member 1 to any significant extent.

Between the pressure-generating clutch member 6 and the pressure plate 5, there is another clutch plate 41 which is restrained against rotation with respect to the clutch output shaft 2 by engagement in the aforesaid longitudinal grooves 21. In the illustrated embodiment, a loose ring of suitable friction material is also provided between the pressure-generating clutch member 6 and the clutch plate 41. This friction material should, if desired, be affixed to the member 6 or to the clutch plate 41 in the same manner illustrated for the friction member 4. However, the provision of such members made of special friction material is not required, since the faces of the friction members may themselves provide friction surfaces in the usual way. Ultimately, the specific nature and conformation of the friction members will depend on the operational requirements to which the friction clutch is subject. Instead of the illustrated disk-shaped friction members, friction members of conical configuration might be provided if desired.

The operation of the representative friction clutch shown in the drawings is as follows. As long as the output shaft 2 is not displaced axially in the direction of the arrow because of the absence of a corresponding steering moment, the friction members 3 and 4 are disengaged. Consequently, the outer clutch member 1, driven by the pinion 8, does not transmit any servo moment to the clutch output shaft 2. The friction member 3 which is angularly linked to the outer member 1 and the pressure-generating member 7 are free to rotate with this member. The pressure-generating member 6 which rotates with axial clearance in the annular groove 12 of the outer member 1 also rotates with the member 1 since it is driven by the engagement of the axially projecting ramp-like surface regions 61 and 71.

If the output shaft 2 is axially displaced in the direction of the arrow due to a steering moment, the shaft becomes effective as a pressure source, and the clutch plate 41, held in fixed angular relation to the shaft, is pressed axially. This pressure is transmitted by the intervening friction ring against the pressure-generating clutch member 6 which is normally free to rotate with the outer clutch member 1. The force thus applied by the clutch plate 41 through the friction ring and the pressure-plate 5 produces a frictional force which tends to lock the pressure-generating member 6 to the clutch plate 41. As a result of the relative rotation between them produced by their different rotational speeds, the two pressure-generating members 6 and 7 are forced apart axially by their engaging ramp-like surfaces 61 and 71. This forces the member 7 axially against the friction members 3 and 4, thereby eliminating the clutch clearance of the assembly. Consequently, the clutch is actuated, i.e., the friction members 3 and 4 are forced into full frictional engagement so that they and their related parts rotate together.

The actuating distance required of the pressure plate 5 to engage the friction clutch, i.e., the requisite axial travel of the output shaft 2 in the direction of the arrow, is comparatively small and remains so even after an extended period of operation of the clutch, regardless of the total number of friction members 3 and 4 in the assembly. In fact, to actuate the clutch, the output shaft 2 need in principle be displaced axially just far enough so that the clutch plate 41 rests against the pressure-generating member 6. Only a very short travel is necessary for this, and it will increase only slightly during the life of the clutch since it is affected only by wear of the engaging friction surfaces of the pressure-generating member 6 and the clutch plate 41. On the other hand, lining wear on the pressure-generating members 3 and 4 of the assembly, and the resulting increase in clutch clearance, does not affect the actuation travel of the output shaft 2 because the axial displacement of the friction members 3 and 4 required for engagement is produced by the pressure-generating clutch member 7, which moves axially away from the pressure-generating clutch member 6 by engagement of the inclined surfaces 61 and 71.

The friction clutch according to the invention is distinguished by having a small actuation distance, which remains fairly constant, for the travel of the clutch plate, and this distance is independent of the total number of friction members in the assembly. Thus, the clutch, with amplification of the normal force acting on the several friction members, provides an automatic compensation for wear of the surfaces of the friction members. Hence, the clutch of the invention is especially well suited to those applications in which space limitation mandate a short actuating travel and/or in which the clutch must respond quickly, even after a relatively short travel.

The application of the invention is not limited to those friction clutches in which a shaft-like clutch output simultaneously performs the function of the shift mechanism such as the axial shaft displacing the pressure plate 5. It may also be employed to advantage in friction clutches having separate shift mechanisms.

Although the invention has been described herein with reference to specific embodiments, many modifications and variations therein will readily occur to those skilled in the art. Accordingly, all such variations and modifications are included within the intended scope of the invention.

We claim:

1. A friction coupling actuated by axial force comprising a clutch drive member rotatable about an axis, a clutch output member coaxial with the clutch drive member, a plurality of axially displaceable friction members having facing engageable friction surfaces and alternately connected in angularly fixed relation to the clutch drive member and the clutch output member, axially displaceable pressure plate means for applying an axial force to produce frictional coupling engagement of the adjacent surfaces of the friction members, and two pressure-generating members operationally interposed between the pressure plate means and the friction members, the pressure-generating members having on one side adjacent facing surfaces with cooperating axially inclined surface portions disposed coaxially about the axis of rotation of the clutch so that the pressure-generating members when in contact with each other are urged axially apart upon relative rotation, exerting an axial force on the friction members, and having friction surfaces on the opposite sides thereof, the pressure-generating member located farther from the pressure plate means being axially displaceable but angularly fixed with respect to the clutch drive member and the pressure-generating member located closer to the pressure plate means being mounted for rotation with respect to the clutch drive member and having an outer periphery received in an axially captive relation to the clutch drive member, and a clutch plate disposed between the pressure plate means and the adjacent pressure-generating member and retained in angularly fixed relation to the clutch output member.

2. A friction clutch according to claim 1 wherein the clutch output member is a shaft which is axially displaceable relative to the clutch drive member and the pressure plate means is affixed to the shaft.

3. A friction clutch according to claim 2 including a motor vehicle servo steering gear having a servo motor coupled to a motor vehicle steering shaft by way of the friction coupling.

* * * * *